Patented Mar. 4, 1924.

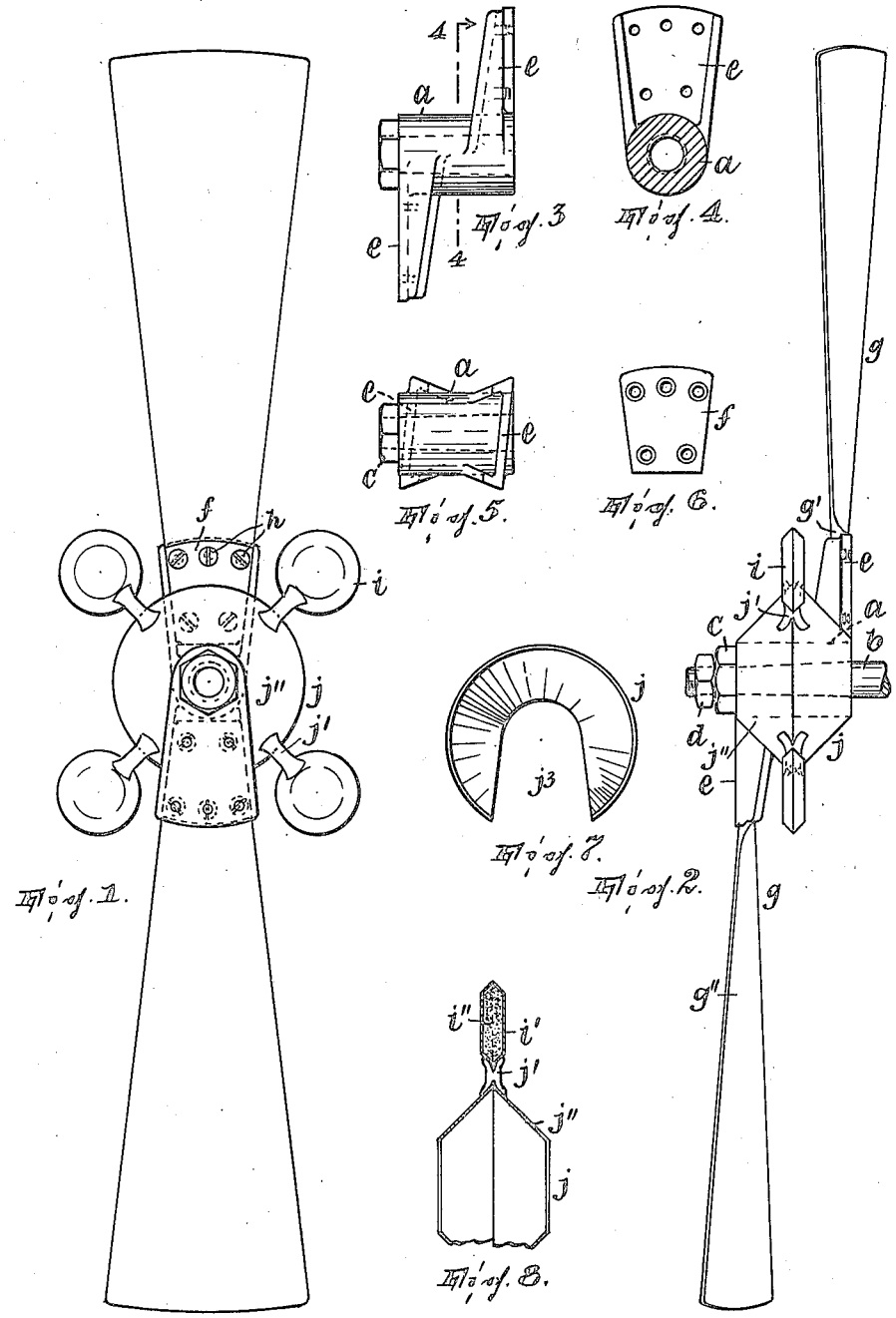

1,485,788

UNITED STATES PATENT OFFICE.

OTTO LAMWERS, OF PATERSON, NEW JERSEY.

AIRCRAFT PROPELLER.

Application filed May 25, 1922. Serial No. 563,496.

*To all whom it may concern:*

Be it known that I, OTTO LAMWERS, a citizen of the United States, residing at Paterson, in the county of Passaic and State of New Jersey, have invented certain new and useful Improvements in Aircraft Propellers, of which the following is a specification.

This invention relates to aircraft propellers, and more particularly to propellers of the class in which the blades extend substantially radially from the axis of rotation and have acting faces or propelling surfaces pitched obliquely to said axis. The principal object of the invention is to provide a propeller which will have an appreciably greater tractive effect when used in aircraft machines than those at present used in such machines; further, to accomplish this result without production of excessive vibration.

Very considerable study and much expensive experimentation have been devoted by aeronautical machine manufacturers and engineers in the effort to increase the traction of the air propeller, so far as I am aware with results that are far from satisfactory. In my own research I have taken into consideration and by actual demonstration have proven that when a propeller of the ordinary kind is rotating at the speed required for propulsion of aircraft much is lost in the way of traction because such a propeller has its blades arranged in the same plane perpendicular to the axis of rotation and each blade therefore rotates in a space where the air-pressure has been more or less reduced by the blade which rotatively preceded it, and this is true even if the advance of the machine be taken into account. And as the result of such research and experimentation I have shown that when a propeller is constructed as herein set forth, to wit, so that whereas centrifugal force acting on the mass represented by any blade thereof is counterbalanced by centrifugal force acting on another or auxiliary mass of substantially equal weight no other appreciable part of the propeller occupies the path of movement of such blade (said propeller or counterbalancing mass itself being arranged in offset relation to said blade longitudinally of the axis of the propeller), a very great increase in traction results. In the propeller shown by way of example in the accompanying drawings, which is of the two-blade type, either blade thereof being considered (i. e., as a blade) the other may be taken as the mentioned counterbalancing mass. But the counterbalancing mass need not be a blade: that is to say, I have in fact shown by experiment that with a propeller actually having only a single blade the traction is still much greater than with any propeller (pluri- or uni-blade) of ordinary type.

In offsetting the masses (the blade and the counterbalancing mass) longitudinally of the axis of the propeller I also found that there resulted from such a propeller a certain amount of vibration that would be undesirable under certain conditions of actual practice, for instance, the high speed required in aircraft propulsion. I am unable to account for this phenomenon excepting on the theory that with said masses offset as stated, so that the tendency of centrifugal force is to throw the propeller axis out of coincidence with the axis of rotation, the beating of the air against the propeller as it seeks to fill the vacuum intermittently produced sets up a fluttering of the propeller more pronounced than it is with the ordinary propeller where, the blades being all in the same plane transverse of the axis of rotation, centrifugal force has no tendency to shift the axis of the propeller out of coincidence with such axis of rotation. However, in further experimenting with a propeller constructed as I have stated I have found that if a gyroscopic stabilizer be properly associated therewith so as to hold it with its axis true to the axis of rotation this undesirable vibratory effect may be entirely eliminated and the efficiency of the device for use in aircraft machines is completed in every respect.

In the example of my invention herein set forth there are present a blade, a counterbalancing mass and a gyroscopic stabilizer. But since it is new in this art to include the stabilizer with the blade when they are offset relatively to each other longitudinally of the axis of rotation my invention is not limited to the presence of a counteracting mass that is specifically a counterbalance; for it is obvious that the stabilizer acts both to eliminate the vibration and to so far otherwise dominate the propeller that a counterbalancing mass for the blade could under certain conditions be omitted.

In short, my invention consists broadly in a propeller including a blade extending substantially radially from, and having an acting surface pitched obliquely to, its axis of rotation, and a mass to counteract centrifugal force acting on said blade when the propeller is rotating and offset longitudinally of said axis relatively to the blade, said propeller having around said axis and except for said blade a substantially clear space represented by the circular path in which the blade rotates.

The invention further consists in such a propeller when the mentioned mass is specifically a counterbalance.

The invention further consists in such a propeller when the mentioned mass is specifically a gyroscopic stabilizer.

The invention further consists in a propeller embodying certain other features and certain combinations hereinafter explained and finally embodied in the clauses of the claim.

In carrying my invention to its best form I attach the stabilizer to the ends of the propeller hub, as by providing it with reversely tapering or conical portions bearing at said hub ends, by which construction any tendency of the hub to vibrate relatively to the stabilizer is best opposed. Also the stabilizer is best formed in sections, rather than a single circular part, thus to reduce its resistance to the air to the minimum.

In the drawings,

Fig. 1 is a front elevation of the improved propeller;

Fig. 2 is a side elevation thereof;

Fig. 3 is a side elevation of the hub and Fig. 4 a section on line 4—4, Fig. 3;

Fig. 5 is a plan of the hub and Fig. 6 a front elevation of one of the plates thereof;

Fig. 7 is a transverse central section of the shell $j''$; and

Fig. 8 shows a detail in section.

$a$ is the cylindrical body of the hub; this preferably has a taper bore to fit with a friction grip on the taper end of the engine shaft $b$, $c$ being an integral faceted head on the hub whereby with a wrench to jam the hub on the shaft and $d$ being a lock-nut which is screwed on the threaded end of the shaft against the hub.

The hub has wings or arms $e$ which are dove-tailed in front elevation, tapering inwardly, each wing or arm having lateral inward flanges. These wings are set in parallel planes slightly oblique to the axis of the hub. One is set at one end and the other at the other end of the hub, they being 180° apart. Each forms an inwardly open pocket. $f$ is a plate which is shaped to fit each pocket. The plates and wings or arms are orificed for the reception of screws, as will appear.

In the sockets are fitted the stub or inner ends $g'$ of the propeller blades $g$ whose acting ends or blades proper $g''$ have substantially the same obliquity with respect to the axis of the hub as the wings or arms $e$. They are held in the pockets by screws $h$ which are passed through the mentioned holes in the plates $f$ and suitable holes in the stubs $g'$ of the blades and screwed into the holes in the wings or arms, the later holes being tapped to receive them. It will be observed that the blades, when the propeller rotates on the axis of the hub, move in parallel planes or strata. I have in the foregoing described the preferred contsruction and except in so far as the arrangement of the blades so that they are offset longitudinaly of the axis of the propeller is concerned the other details are not indispensable. In the present example, where there are only two blades, it will be understood that the weight of all that mass which includes either blade, its supporting arm or wing and the described accessories thereof equals that of the other similar mass. As already made clear, both of these masses need not necessarily be blades; one may be a blade and the other be a mass of any other form suitable to act as a counterbalance to such blade.

The gyroscopic stabilizer is shown in the illustrated example as consisting of four bodies $i$ equal in mass and preferably of the same size and shape, the shape shown being that of a disk with its edge double-beveled, and a carrier $j$ by which said bodies, equidistantly spaced from each other and from the axis of the propeller hub, are supported on said hub. Each body $i$, as shown, comprises a steel shell $i'$ loaded with lead or other heavy material $i''$. The carrier includes four spokes $j'$ and a steel shell $j''$ which is double-conical in form and has its ends welded to the ends of the hub, which it houses, each spoke being tubular and having its ends split and straddling and welded to the edge of the shell on the one hand and the edge of one of the bodies $i$ on the other; in order to clear the arms or wings $e$ the shell is cut away, as at $j^3$ at diametrically opposite points, being welded to said arms. It is not indispensable to form the stabilizer with several distinct bodies $i$, that is, with its outer portion as a non-continuous or interrupted mass; it may be a continuous mass or plain rim. But I prefer to give it the interrupted or non-continuous form so that it will offer as little resistance to the wind as possible, which is partly the object of forming its carrier portion or shell $j''$ conical. The principal object, however, in forming the carrier mainly as a double-conical wall-structure is to support the hub at the points of best advantage (its ends) on the gyroscopic stabilizer when in action as such, so that vibration of the hub will be prevented, and to do this without forming the carrier portion unduly heavy, it being understood that the best results will be attained where the greatest mass of the stabilizer is remote from the axis of rotation.

The combined weight of the several bodies $i$ may vary, but in all cases it should be such that at the speed at which the propeller is intended to rotate the gyroscopic stabilizer shall dominate the propeller and maintain its axis true to the axis of rotation (the true axis of shaft $b$) regardless of the effort of the blades, as an incident of centrifugal force, to cant or tilt the hub to a position where its axis would not be true to or coincident with the axis of rotation. I have found that as a general rule the combined weight of said bodies is best when about three times that of the two blades $g$.

I have experimented with gyroscopic stabilizers arranged otherwise than as shown; but I find that the best results are obtained when there is one stabilizer arranged in a plane midway between the planes of the masses represented by the two blades, in accordance with the particular adaptation of my invention herein shown and described.

In comparative tests with propellers constructed according to my invention, one with two blades as herein shown and the other with but one (the latter comprising one of the blades shown and a counterbalancing mass equal in weight to the other blade, which was removed) as against a two-blade propeller of ordinary type used in aircraft machines and having its blades arranged as usual in the same plane perpendicular to the axis of rotation of the propeller, I have shown the following results, to wit: that at 750 R. P. M., whereas the ordinary propeller would advance a load a distance represented by 4, my single-blade propeller would advance the same load a distance represented by 6 and my two-blade propeller would advance said load a distance represented by 8; and at 1150 R. P. M., whereas the ordinary propeller would advance said load a distance represented by 7, my single-blade propeller would advance it a distance represented by 28 and my two-blade propeller would advance it a distance represented by 30.

Having thus fully described my invention, what I claim as new and desire to secure by Letters Patent is:—

1. An aircraft propeller having one blade and a counter-balance offset longitudinally of the axis of rotation relatively to the blade, said propeller having, except for the blade and the offset counterbalance, a substantially clear space bounded by the separate circular paths in which the blade and the counterbalance respectively rotate.

2. An aircraft propeller including a blade extending substantially radially from, and having an acting surface pitched obliquely to, its axis of rotation, and a gyroscopic stabilizer offset longitudinally of said axis relatively to the blade, said propeller having around said axis and except for said blade a substantially clear space bounded by the circular path in which the blade rotates.

3. An aircraft propeller including a blade extending substantially radially from, and having an acting surface pitched obliquely to, its axis of rotation, a mass forming a counter-balance to said blade when the propeller is rotating and offset longitudinally of said axis relatively to the blade, and a gyroscopic stabilizer arranged in a plane substantially midway between said blade and mass, said propeller having around said axis and except for said blade a substantially clear space bounded by the circular path in which the blade moves.

4. An aircraft propeller having a hub and masses offset relatively to each other longitudinally of the axis of rotation of the hub and forming centrifugal counterbalances for each other and one of which is a blade, said propeller also having a gyroscopic stabilizer whose portion of greatest mass is remote from the hub and whose portion between the hub and said first-named portion includes two members supported on the respective end portions of the hub.

5. An aircraft propeller having a hub and masses offset relatively to each other longitudinally of the axis of rotation of the hub and forming centrifugal counterbalances for each other and one of which is a blade, said propeller also having a gyroscopic stabilizer whose portion of greatest mass is remote from the hub and whose portion between the hub and said first-named portion includes two reverse substantially conical walls supported on the respective end portions of the hub.

6. A propeller having a plurality of propulsion blades offset relatively to each other longitudinally of its axis of rotation and centrifugal counterbalances of non-propulsive character offset with respect to said blades, said propeller having around said axis, except for said blades, substantially clear spaces bounded by the circular paths in which the blades respectively rotate.

7. An aircraft propeller having a pair of blades offset relatively to each other longitudinally of its axis of rotation, and a gyroscopic stabilizer arranged in a plane substantially midway between said blades, said propeller having around said axis and except for said blades substantially clear spaces bounded by the circular paths in which the blades respectively rotate.

8. An aircraft propeller having a relatively high operative speed and comprising a plurality of blades offset relatively to each other longitudinally of its axis of rotation, centrifugal counterbalances extending radially outward from said axis for each blade, each counterbalance being offset with respect to its blade, said propeller having around said axis and except for said blades substantially clear spaces bounded by the circular paths in which the blades respectively rotate.

9. A propeller hub for air craft comprising a cylindrical body adapted for connection with a shaft, wings extending radially outward from said body in offset relation to each other, said wings being each provided with a recess adapted to receive the stub end of a propeller blade and hold said blade therein in a plane oblique to the axis of the body, means independent of said cylindrical body adapted to fit said recesses for fixedly positioning the stub ends of propeller blades therein and fastening means whereby said positioning means is secured in place.

10. A propeller hub for air craft comprising a cylindrical body adapted for connection with a shaft, wings extending radially outward from said body in offset relation to each other, said wings being each provided with a recess adapted to receive the stub end of a propeller blade and hold said blade therein, the bottom wall of said recess extending in a plane oblique to the axis of the body, means independent of said cylindrical body adapted to fit said recesses for fixedly positioning the stub ends of propeller blades therein and fastening means whereby said positioning means is secured in place.

11. A propeller hub for air craft comprising a body having an axial bore adapted to fit upon a shaft, wings extending radially outward from said body in opposite directions and in planes offset with respect to each other, said wings each having an undercut recess, said recess tapering toward the body and having its bottom wall extending in a plane oblique to the axis of said body, plates independent of said body adapted to fit said recesses for securing the stub ends of propeller blades therein and means whereby said positioning means is secured in place.

12. A propeller for aircraft comprising a hub, a hollow shell housing the same and welded to said hub, blades extending outwardly from said hub in offset relation to each other, and a plurality of weighted bodies carried by said hollow shell at spaced intervals in a plane between the planes in which said blades are located.

13. A propeller for aircraft comprising a hub, wings extending outwardly therefrom in opposite directions at opposite ends of said hub, said wings having dovetail recesses, the bottom walls of which extend in planes oblique to the axes of said hubs, propeller blades having their stub ends located in said recesses, plates fitting the latter and secured to said wings, whereby said stub ends are fixed in said recesses, a hollow shell of double-conical form housing said hub and fixed to the ends thereof, said shell being provided with recesses fitting over said wings, a plurality of spokes extending outwardly from said shell at spaced intervals, and weighted bodies carried by said spokes.

In testimony whereof I affix my signature.

OTTO LAMWERS.